United States Patent
Hasegawa et al.

(10) Patent No.: US 8,360,499 B2
(45) Date of Patent: Jan. 29, 2013

(54) DECORATIVE MOLDING AND FRAMED WINDOW GLASS PLATE FOR VEHICLE

(75) Inventors: Takuya Hasegawa, Tsu (JP); Mitsuhiro Takayama, Matsusaka (JP); Teturo Yamada, Obu (JP); Koichi Fukuta, Okazaki (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 13/203,906

(22) PCT Filed: Feb. 18, 2010

(86) PCT No.: PCT/JP2010/052426
§ 371 (c)(1),
(2), (4) Date: Aug. 30, 2011

(87) PCT Pub. No.: WO2010/106867
PCT Pub. Date: Sep. 23, 2010

(65) Prior Publication Data
US 2012/0025554 A1    Feb. 2, 2012

(30) Foreign Application Priority Data
Mar. 18, 2009   (JP) .................. 2009-065341

(51) Int. Cl.
*B60J 1/20* (2006.01)
(52) U.S. Cl. ...................................... 296/84.1
(58) Field of Classification Search .............. 296/84.1, 296/93
See application file for complete search history.

(56) References Cited

U.S. PATENT DOCUMENTS

| | | | | |
|---|---|---|---|---|
| 3,981,958 A | * | 9/1976 | Nakashima et al. | 525/265 |
| 4,228,438 A | * | 10/1980 | Vazirani | 347/102 |
| 4,259,163 A | * | 3/1981 | Suzuki et al. | 204/484 |
| 4,333,807 A | * | 6/1982 | Suzuki et al. | 204/488 |
| 6,787,190 B2 | * | 9/2004 | Iizuka | 427/385.5 |
| 6,951,376 B2 | * | 10/2005 | Ishikawa | 347/11 |
| 2003/0189609 A1 | * | 10/2003 | Ishikawa | 347/11 |
| 2007/0054116 A1 | | 3/2007 | Neitzke | |
| 2007/0224404 A1 | * | 9/2007 | Finley et al. | 428/220 |

(Continued)

FOREIGN PATENT DOCUMENTS
JP    61-46714 A      3/1986
JP    63235142 A  *  9/1988

(Continued)

OTHER PUBLICATIONS

International Search Report including English language translation dated Jun. 1, 2010 (Five (5) pages).

(Continued)

*Primary Examiner* — H Gutman
(74) *Attorney, Agent, or Firm* — Crowell & Moring LLP

(57) ABSTRACT

A decorative molding that is to be fixed to a frame of a framed window glass plate for a vehicle is provided. The decorative molding is configured such that when the frame is formed around a peripheral portion of a glass plate by injecting a molten resin, the decorative molding is simultaneously fixed to the frame. The body of the decorative molding is made of a metal. A cationically electrodeposited coating film is formed on a surface of the body of the decorative molding and a resinous coating film is formed on the cationically electrodeposited coating film.

9 Claims, 2 Drawing Sheets

U.S. PATENT DOCUMENTS

2009/0152508 A1* 6/2009 Handa et al. .................. 252/511
2010/0136348 A1 6/2010 Nakata

FOREIGN PATENT DOCUMENTS

| | | | |
|---|---|---|---|
| JP | 6-72144 A | | 3/1994 |
| JP | 2003-25837 A | | 1/2003 |
| JP | 2003025837 A | * | 1/2003 |
| JP | 2007-1535 A | | 1/2007 |
| JP | 2007-522958 A | | 8/2007 |
| JP | 2008-1122 A | | 1/2008 |
| JP | 2008001122 A | * | 1/2008 |
| JP | 2008-174663 A | | 7/2008 |
| JP | 2008174663 A | * | 7/2008 |

OTHER PUBLICATIONS

PCT/ISA/237 Form (Three (3) pages).

* cited by examiner

DECORATIVE MOLDING AND FRAMED WINDOW GLASS PLATE FOR VEHICLE

TECHNICAL FIELD

The present invention relates to a window glass plate for a vehicle which has therearound a frame formed by injection molding, and more particularly to a framed window glass plate which is produced by setting, in a cavity of an injection molding die assembly, both a glass plate and a decorative molding, injecting a molten resin into the cavity, curing the molten resin to form a frame around the glass plate, and simultaneously fixing the decorative molding to the frame.

BACKGROUND ART

In general, a window glass plate for use in vehicles such electric cars, automobiles and the like is connected to a metallic vehicle body through a frame of resin.

The frame of resin is directly formed around a peripheral portion of the glass plate by extruding or injecting molten resin therearound. With this, a framed window glass plate constructed by the frame and the glass plate, which are mutually integrated, is produced and used as an element for assembling the vehicle.

For decoration and reinforcement, to the frame, there is often fixed through adhesive a decorative molding produced by press work, extrusion work or the like.

In Patent Document 1, there is disclosed a technique in which before forming a frame by injection molding, a decorative molding is set in a cavity of an injection molding die assembly, so that upon completion of the injection molding, the frame and the decorative molding are integrally and tightly mounted around a peripheral portion of the glass plate.

In Patent Document 2, there is disclosed a framed window glass plate that is produced by, before forming a frame by injection molding, setting in a cavity of an injection molding die assembly both a decorative molding of resin or metal and a reinforcing member as insert members, injecting molten resin for the frame into the cavity and curing the same. With this method, a framed window glass plate having the insert members integrally mounted therearound is produced.

In Patent Document 3, there is disclosed a decorative molding having a coating film formed thereon. The coating film is a clear coat that is formed into a film from acrylic resin paint, polyester resin paint or fluorocarbon resin paint through a chrome free conversion paint containing insoluble metal salt and soluble metal salt. The coating film is connected to a body proper of a precoat stainless steel plate to constitute the decorative molding.

In Patent Document 4, there is described a cationic electropainting (or cationically electrodeposited coating). That is, a technique is described in which a cationic electropaint is provided which contains 20 to 25 wt % of urethane denatured acrylic resin, 1 to 2 wt % of polyamine resin, 2 to 3 wt % of polyacrylic resin, coloring pigment, non-lead rust inhibiting pigment and curing catalyst, and then onto a film of the cationic electropaint, there is applied a film of thermosetting paint.

In the current years, depending on taste of vehicle users, there is such a tendency that the decorative molding has the same color as the vehicle body and the frame, which causes a need of multi-coloring of the decorative molding.

In case of the above-mentioned method in which forming the frame around the glass plate and fixing the decorative molding to the frame are simultaneously made, injection of high temperature and high pressure molten resin to the cavity tends to bring about such an undesired result that the decorative molding has on an outer surface thereof an appearance failure, such as deformation, discoloring, etc. In particular, such failure tends to appear at a certain portion of the decorative molding by which the decorative molding is fixed in the cavity of the molding die assembly. Thus, decorative moldings without such appearance failure are widely wanted.

PRIOR ART DOCUMENTS

Patent Documents:
Patent Document 1: Japanese Laid-open Patent Application (Tokkaihei) 6-72144.
Patent Document 2: Japanese Laid-open Patent Application (Tokkai) 2007-001535.
Patent Document 3: Japanese Laid-open Patent Application (Tokkai) 2008-001122.
Patent Document 4: Japanese Laid-open Patent Application (Tokkai) 2008-174663.

SUMMARY OF INVENTION

Problem To Be Solved By Invention

As is described hereinabove, the method of producing a framed window glass plate for a vehicle by forming a frame around a glass plate by injection molding and simultaneously fixing a decorative molding to the frame tends to induce an appearance failure at the time of injection molding. In accordance with the present invention, it is possible to provide a decorative molding suitable for the multi-coloring and a framed window glass plate for a vehicle which is suppressed from having an appearance failure at the time of injection molding.

Means for Solving Problem

A decorative molding of the present invention is a decorative molding to be fixed to a frame of a framed window glass plate for a vehicle. The decorative molding is characterized in that when the frame is formed around the glass plate by injecting molten resin around the same, the decorative molding is simultaneously fixed to the frame, a body proper of the decorative molding is constituted of a metal, a coating film is formed on a surface of the body proper by cationic electrodeposition and a resinous coating film is formed on the cationically electrodeposited coating film.

Furthermore, the decorative molding of the invention is characterized in that the resinous coating film contains therein a pigment or dye.

Furthermore, the decorative molding of the invention is characterized in that the resinous coating film is made of at least one resin or more selected from a group including a melamine-based resin, acrylic resin, polyester-based resin, fluororesin and epoxy resin.

Furthermore, the framed window glass plate for a vehicle according to the present invention is characterized in that before forming the frame around a peripheral portion of the glass plate by injecting molten resin therearound, the decorative molding of the invention is set in a cavity of the die assembly and thereafter the molten resin is injected into the cavity and cured, is resulting in that the decorative molding is fixed to the frame.

Furthermore, the framed window glass plate of a vehicle according to the present invention is characterized in that with a pigment or dye contained in the resinous coating film, the decorative molding has the same color as the frame or the body of the vehicle.

Advantageous Effects

In accordance with the present invention, there is provided a framed window glass plate for a vehicle in which undesired appearance failure of a decorative molding, which would occur at the time of making an injection molding, hardly occurs, and a decorative molding suitable for the multi-coloring is fixed to the frame.

BEST MODES FOR CARRYING OUT INVENTION

The decorative molding of the invention is a member that is to be integrally connected to a frame when, for the purpose of producing a framed window glass plate for a vehicle, the frame is formed around a peripheral portion of a glass plate by injection molding. That is, the decorative molding is set in a cavity of a molding die assembly, and thereafter a molten resin for the frame is injected into the cavity and cured resulting in that the decorative molding is fixed to the frame.

Figure 1:
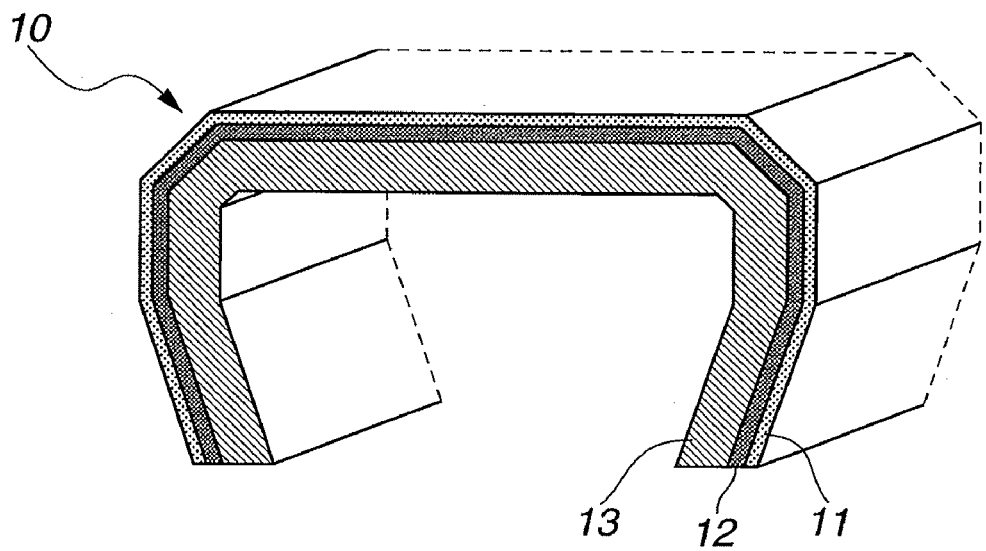
FIG. 1 is a perspective view schematically showing a construction of a decorative molding.

As is shown in FIG. 1, the decorative molding of the invention is so constructed that a cationically electrodeposited is coating film 12 is formed on a body proper 13 of the decorative molding 10 and a resinous coating film 11 is formed on the cationically electrodeposited coating film 12.

The body proper 13 may be provided by subjecting a metal member, such as stainless steel member, iron member, steel member, aluminum member or the like to a press work, extrusion work, drawing work or the like.

The cationically electrodeposited coating film 12 may be made of a resin composite produced by denaturing polyester-polyols, polyether-polyols, polycarbonate-polyols, polyurethane-polyols, polyolefine-polyols or acrylic-polyols by isocyanate group, calboxyl group or epoxy group.

The cationically electrodeposited coating film 12 has an excellent adherence to metal, which increases a mechanical connection (or adherence) between the resinous coating film 11 and the body proper 13 which is made of a metal. As a material of the resinous coating film 11, a melamine-based resin, acrylic resin, polyester-based resin, fluororesin or epoxy resin is usable. If permitted by the kind of the resinous coating film, heating may be applied to the film for increasing a mechanical strength of the resinous coating film.

By the application of the resinous coating film 11, the durability of the decorative molding is increased.

Furthermore, due to presence of the resinous coating film 11, the decorative molding has a shine on its outer surface.

If the resinous coating film is made of a melamine-based resin, it exhibits an excellent heat resistance, and thus, even when, during injection molding of the frame, the film contacts with the high temperature and high pressure molten resin, it is not denatured.

Furthermore, by containing a coloring pigment in the coating paint used for producing the cationically electrodeposited coating film 12 or the resinous coating film 11, it is possible that the decorative molding 10 is colored to the same color as the frame and the body of the vehicle.

Although there is no limitation in selecting coloring pigments, inorganic pigments, such as titanium oxide, carbon black, ferric oxide and the like, and organic pigments, such as aniline black, vermillion red, lake red, phthalocyanine blue, fast sky blue and the like are suitably usable.

Figure 2:
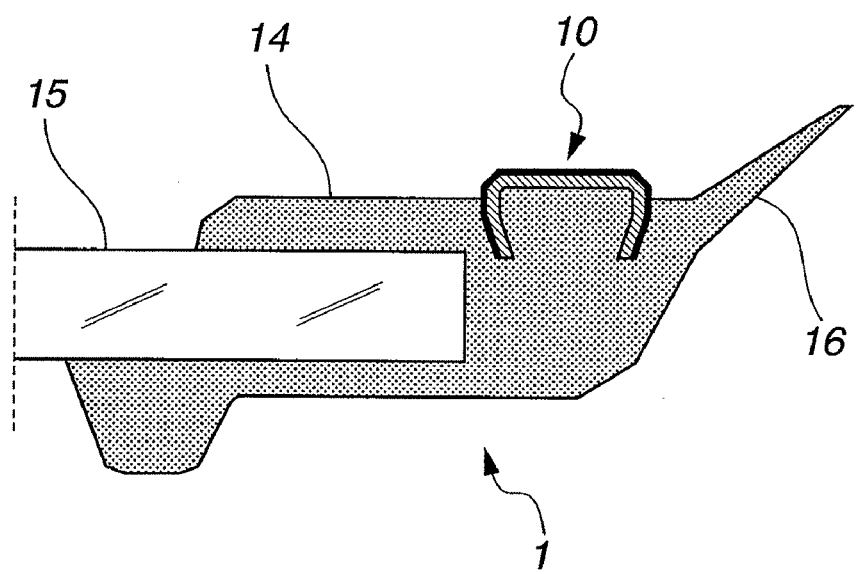
FIG. 2 is a schematically illustrated sectional view of a peripheral portion of a framed window glass plate for a vehicle, which is produced by using the decorative molding.

FIG. 2 shows a framed window glass plate 1 for a vehicle in which the decorative molding 10 is fixed to a frame 14 of a glass plate 15.

The decorative molding 10 not only decorates the frame 14 but also serves as a reinforcing member to compensate the lack of strength of the frame.

As a material of the frame 14, a thermoplastic elastomer, such as styrene resin, olefinic resin, vinyl chloride resin, urethane resin or the like is usable.

Figure 3:
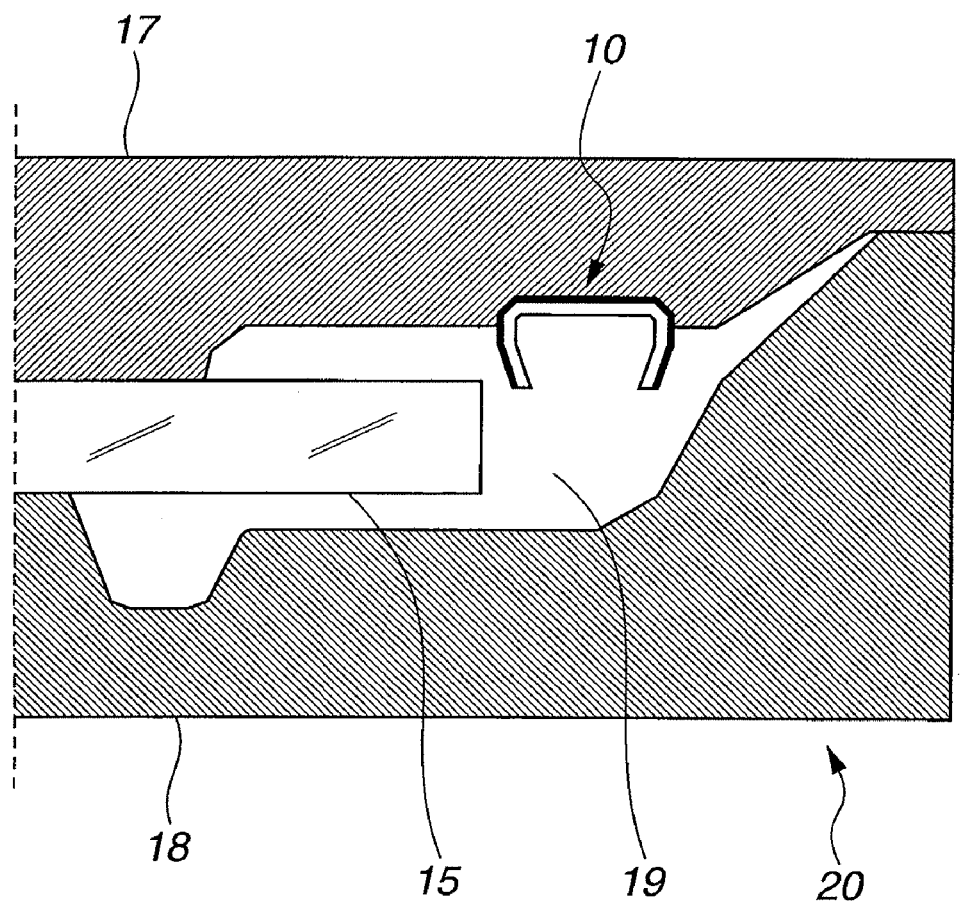
FIG. 3 is a schematically illustrated sectional view of a molding die assembly used for producing the framed window glass plate for a vehicle of the present invention.

FIG. 3 is a drawing showing arrangement of the decorative molding 10 in a cavity 19 of an injection molding die assembly 20 at the time of producing the framed window glass plate for a vehicle. As shown, between an upper die (openable type) 17 and a lower die (fixed type) 18, there is set the glass plate 15. Under this condition, a peripheral portion of the glass plate 15 is placed in a cavity 19 that is used for molding the frame.

Molten resin for the frame is injected into the cavity 19 and cured to constitute the frame and simultaneously the decorative molding 10 is fixed to the frame.

Holding the decorative molding 10 in the cavity of the injection molding die assembly 20 is made with the aid of electromagnets (not shown) or press pins (not shown). After the frame is formed by injecting the molten resin into the cavity and curing the same, the upper die (openable type) 17 is opened upward and then the glass plate having the frame formed therearound is took out from the die assembly. Upon this, the framed window glass plate for a vehicle according to the present invention is produced.

In FIG. 3, there is shown an arrangement wherein the decorative molding 10 is arranged to the upper die (openable type) 17 that constitutes part of the cavity 19. However, if desired, the decorative molding 10 may be arranged to the lower die (fixed type) 18.

The die assembly shown in FIG. 3 is of a type wherein the upper die (openable type) is pivotal upward and downward. However, if desired, the die assembly may be of a type wherein the upper die (openable type) is pivotal in a horizontal direction.

Embodiments

In the following, the present invention will be described in detail with reference to the accompanying drawings. However, the present invention is not limited to an embodiment that will be described in the following.

The decorative molding 10 shown in FIG. 1 was produced by taking the following steps.

As the body proper 13 of the decorative molding 10, there was used a member provided by pressing a stainless steel plate.

Using a mixture provided by mixing a cationic electropaint containing mainly urethane denatured acrylic resin with a carbon black pigment, a cationically electrodeposited coating film 12 was formed on the body proper 13, and on the cationically electrodeposited coating film 12, there was formed a melamine-based resin film as a resinous coating film 11.

Each time when forming of the cationically electrodeposited coating film 12 was finished and each time when forming of the resinous coating film 11 (viz., melamine-based resin film) was finished, baking was applied to the film 12 and film 11 at a temperature ranging from 170 to 200° C. for about 15 to 20 minutes.

As a glass plate 15 to which a frame is to be mounted, there was used a window glass plate for a vehicle, which was provided by bending a glass plate of 3 mm in thickness into a given shape.

As is seen from FIG. 3, the glass plate 15 was arranged between the upper die 17 and the lower die 18, and a molten resin of vinyl chloride was injected into the cavity 19 in which the decorative molding 10 was held, and the molten resin was cured. With such steps, the framed window glass plate for a vehicle as shown in FIG. 2 was produced.

For holding the decorative molding 10 in the mold assembly, electromagnets (not shown) were used.

The framed window glass plate for a vehicle having the decorative molding fixed thereto according to the invention was an excellent one showing no appearance failure on the outer surface of the decorative molding, such as deformation, discoloring, ext.

Explanation of References

1 . . . framed window glass plate for vehicle
10 . . . decorative molding
11 . . . resinous film
12 . . . cationically electrodeposited coating film
13 . . . body proper
14 . . . frame
15 . . . glass plate
16 . . . lip portion
17 . . . upper die (openable type)
18 . . . lower die (fixed type)
19 . . . cavity

The invention claimed is:

1. A decorative molding that is to be fixed to a frame of a framed window glass plate for a vehicle, the decorative molding being characterized in that when the frame is formed around a peripheral portion of a glass plate by injecting a molten resin therearound, the decorative molding is simultaneously fixed to the frame, a body proper of the decorative molding is made of a metal, a cationically electrodeposited coating film is formed on a surface of the body proper of the decorative molding, and a resinous coating film is formed on the cationically electrodeposited coating film.

2. A decorative molding as claimed in claim 1, which is further characterized in that the resinous coating film has a pigment or dye contained therein.

3. A decorative molding as claimed in claim 1, which is further characterized in that the resinous coating film is made of at least one or more selected from a group including a melamine-based resin, acrylic resin, polyester-based resin, fluororesin and epoxy resin.

4. A decorative molding as claimed in claim 1, which is further characterized in that the body proper of the decorative molding is made of a metal, and the body proper is provided by pressing a stainless steel plate.

5. A decorative molding as claimed in claim 1, which is further characterized in that by using a mixture provided by mixing a cationic electropaint containing mainly urethane denatured acrylic resin with a carbon black pigment, a cationically electrodeposited coating film is formed on the body proper, and a melamine-based resin is coated on the cationically electrodeposited coating film.

6. A decorative molding as claimed in claim 5, which is further characterized in that the cationically electrodeposited coating film and the melamine-based resin are subjected to a baking.

7. A framed window glass plate for a vehicle, which is characterized in that before forming the frame around the glass plate set in an injection molding die assembly by injection molding, the decorative molding claimed in claim 1 is set in a cavity of the die assembly, and when a molten resin is injected into the cavity and cured thereby to form the frame, the decorative molding is fixed to the frame.

8. A framed window glass plate for a vehicle as claimed in claim 7, which is further characterized in that due to the pigment or dye mixed in the resinous coating film, the decorative molding has the same color as the frame or a body of the vehicle.

9. A decorative molding as claimed in claim 1, which is further characterized in that the resinous coating film has a pigment or dye contained therein and the resinous coating film is made of at least one or more selected from a group including a melamine-based resin, acrylic resin, polyester-based resin, fluororesin and epoxy resin.

* * * * *